(12) United States Patent
Suzuki

(10) Patent No.: US 9,257,930 B2
(45) Date of Patent: Feb. 9, 2016

(54) CONTROLLER FOR MULTIPLE-PHASE ROTATING MACHINE

(71) Applicant: DENSO CORPORATION, Kariya, Aichi-Pref. (JP)

(72) Inventor: Takashi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 64 days.

(21) Appl. No.: 13/934,715

(22) Filed: Jul. 3, 2013

(65) Prior Publication Data

US 2014/0009093 A1    Jan. 9, 2014

(30) Foreign Application Priority Data

Jul. 4, 2012    (JP) ................. 2012-150836

(51) Int. Cl.
*H02P 21/00* (2006.01)
*H02P 25/22* (2006.01)
*H02P 29/02* (2006.01)

(52) U.S. Cl.
CPC ........ *H02P 21/0096* (2013.01); *H02P 21/0003* (2013.01); *H02P 25/22* (2013.01); *H02P 29/022* (2013.01)

(58) Field of Classification Search
USPC ............ 318/400.02, 400.09, 400.11, 400.22, 318/400.34, 490, 496, 778, 801
See application file for complete search history.

(56) References Cited

U.S. PATENT DOCUMENTS

| | | | | |
|---|---|---|---|---|
| 8,076,814 B2 * | 12/2011 | Tupper et al. | ................. | 310/179 |
| 2003/0085683 A1 | 5/2003 | Satake et al. | | |
| 2009/0256503 A1 * | 10/2009 | Ueda et al. | ............... | 318/400.02 |
| 2010/0030412 A1 * | 2/2010 | Mitsutani | ........................ | 701/22 |
| 2010/0231151 A1 * | 9/2010 | Ohtani et al. | ............. | 318/400.09 |
| 2011/0057591 A1 * | 3/2011 | Tagome et al. | .......... | 318/400.23 |
| 2011/0074333 A1 | 3/2011 | Suzuki | | |
| 2011/0156627 A1 * | 6/2011 | Nakamura | ........... | B62D 5/0403 318/400.22 |
| 2011/0315470 A1 | 12/2011 | Uryu | | |
| 2011/0316466 A1 * | 12/2011 | Uryu | ............................. | 318/490 |

FOREIGN PATENT DOCUMENTS

| | | |
|---|---|---|
| JP | 2003-153579 | 5/2003 |
| JP | 2005-304119 | 10/2005 |
| JP | 2007-259538 | 10/2007 |

OTHER PUBLICATIONS

Office Action (2 pages) dated Apr. 15, 2014, issued in corresponding Japanese Application No. 2012-150836 and English translation (2 pages).

* cited by examiner

*Primary Examiner* — Eduardo Colon Santana
*Assistant Examiner* — Cortez Cook
(74) *Attorney, Agent, or Firm* — Nixon & Vanderhye P.C.

(57) ABSTRACT

A controller for a multiple-phase rotating machine includes power converters for supplying alternating current to winding sets of the rotating machine. A pair of each electrical power converter and a corresponding winding set forms a system. The controller further includes a failure detector for detecting a failure in each system. The failure causes a braking current in the rotating machine. The controller further includes a control section for setting a d-axis current and a q-axis current to drive the power converter in each system. When the failure detector detects the failure in any one of the systems, the control section stops the power converter in the failed system and sets the d-axis current in the normal system in such a manner that an electric current in the failed system is reduced.

8 Claims, 9 Drawing Sheets

CONTROLLER FOR MULTIPLE-PHASE ROTATING MACHINE

CROSS REFERENCE TO RELATED APPLICATION

This application is based on Japanese Patent Application No. 2012-150836 filed on Jul. 4, 2012, the contents of which are incorporated herein by reference.

FIELD

The present disclosure relates to a controller for a multiple-phase rotating machine.

BACKGROUND

JP-2005-304119 discloses a controller for a multiple-phase rotating machine having multiple winding sets. In the controller, when some of multiple inverters fail to supply power to the winding sets, the others of the inverters supply power to the winding sets. Thus, even when some of the inverters fail to operate, normal inverters can continue to drive the rotating machine.

SUMMARY

Assuming that a failure such as a short-circuit occurs in any one of systems, even when a power converter in the failed system stops operating, a counter-electromotive force (i.e., back electromotive force) is generated so that an electric current can flow through the power converter and the winding set in the failed system. The current may cause heat generation and torque ripple.

In view of the above, it is an object of the present disclosure to provide a controller which is used for a multiple-phase rotating machine and capable of reducing heat generation and torque ripple in a failed system by reducing an electric current in a power converter and a winding set in the failed system.

According to an aspect of the present disclosure, a controller is used for driving a multiple-phase rotating machine having winding sets magnetically coupled together. Each winding set includes phase windings. The controller includes electrical power converters capable of supplying alternating current to the winding sets. Each electrical power converter includes legs. Each leg is constructed with switching devices and provided to a corresponding phase winding. A pair of each electrical power converter and a corresponding winding set forms a system. The controller further includes a failure detector capable of detecting a failure in the electrical power converter or the winding set in each system. The failure causes a braking current in the rotating machine. The controller further includes a control section capable of controlling an output of the electrical power converter by setting a d-axis current and a q-axis current to drive the electrical power converter. When the failure detector detects the failure in any one of the systems, the control section stops the electrical power converter in the failed system and controls the output of the electrical power converter in the normal system by setting the d-axis current in such a manner that an electric current in the failed system is reduced.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure are described below with reference to the drawings. In the embodiments, the present disclosure is embodied as a controller for a multiple-phase rotating machine used in an electric power steering apparatus of a vehicle.

First Embodiment

A first embodiment of the present disclosure is described below with reference to FIGS. 1-9.

Figure 2:
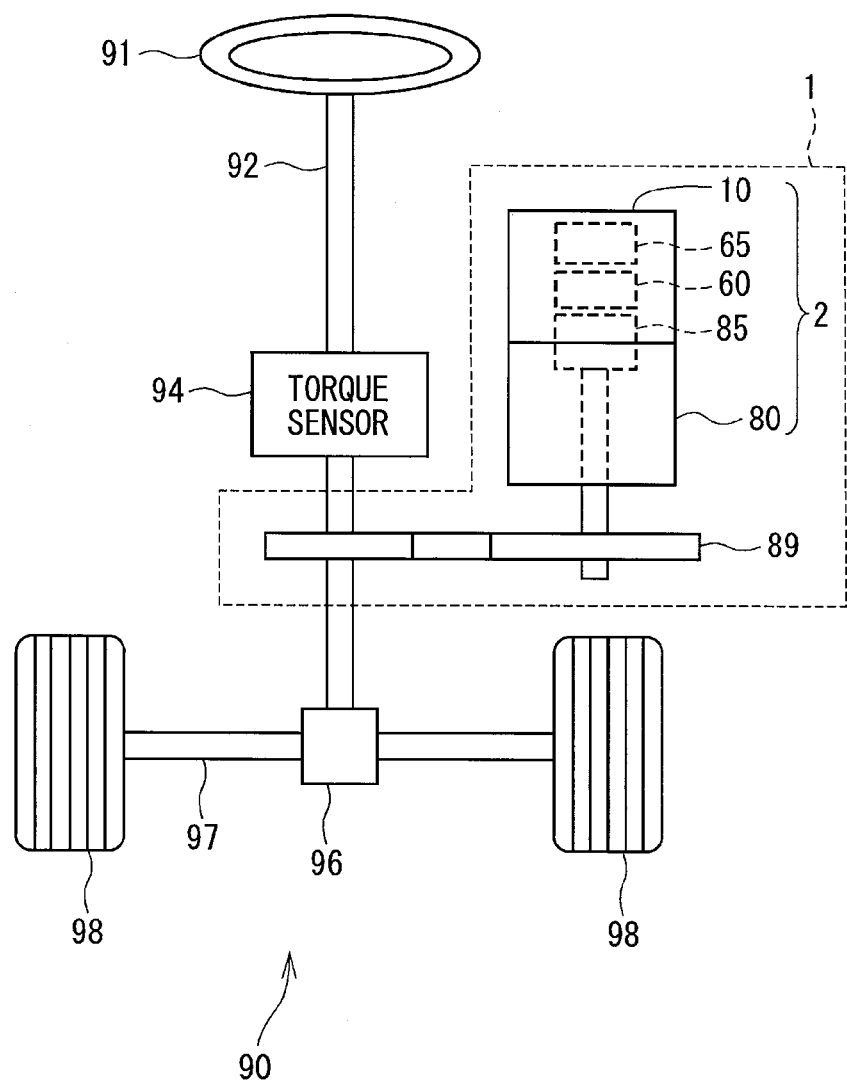
FIG. 2 is a diagram illustrating an electric power steering apparatus having the controller.

FIG. 2 shows a steering system 90 having an electric power steering apparatus 1. A torque sensor 94 for detecting steering torque is mounted on a steering shaft 92 coupled to a steering wheel 91. A pinion gear 96 is located at an end of the steering shaft 92 and meshes with a rack shaft 97. A tire wheel 98 is rotatably fixed to each end of the rack shaft 97 through a tie rod or the like. A rotation motion of the steering shaft 92 is converted by the pinion gear 96 to a linear motion of the rack shaft 97. Each tire wheel 98 is steered to an angle corresponding to a displacement of the linear motion of the rack shaft 97.

The electric power steering apparatus 1 includes an actuator 2 and a reduction gear 89. The actuator 2 rotates a rotation shaft. The reduction gear 89 reduces a speed of rotation of the rotation shaft and transmits the rotation to the steering shaft 92. Thus, the reduction gear 89 serves as a mechanical power transmission device.

The actuator 2 includes a motor 80 and an electronic control unit (ECU) 10. The motor 80 acts as a multiple-phase rotating machine for producing steering assist torque. The ECU 10 acts as a control unit for driving the motor 80. According to the first embodiment, the motor 80 is a three-phase brushless motor and rotates the reduction gear 89 in forward and reverse directions.

The ECU 10 includes a control section 65 and an inverter section 60. The inverter section 60 serves as an electrical power converter that controls electrical power supply to the motor 80 in accordance with a command from the control section 65.

A rotation sensor 85 includes a magnet and a magnetic detector. The magnet is located in the motor 80, and the magnetic detector is located in the ECU 10.

The rotation sensor 85 detects a rotation angle θ of the motor 80 and also detects a rotation angular velocity ω which is the amount of a change in the rotation angle θ per unit time.

The control section 65 controls the inverter section 60 based on a rotation angle signal from the rotation sensor 85, a vehicle speed signal from a vehicle speed sensor (not shown), and a steering torque signal from the torque sensor 94. Thus, the actuator 2 of the electric power steering apparatus 1 produces and transmits steering assist torque, which assists in steering the steering wheel 91, to the steering shaft 92.

Figure 1:
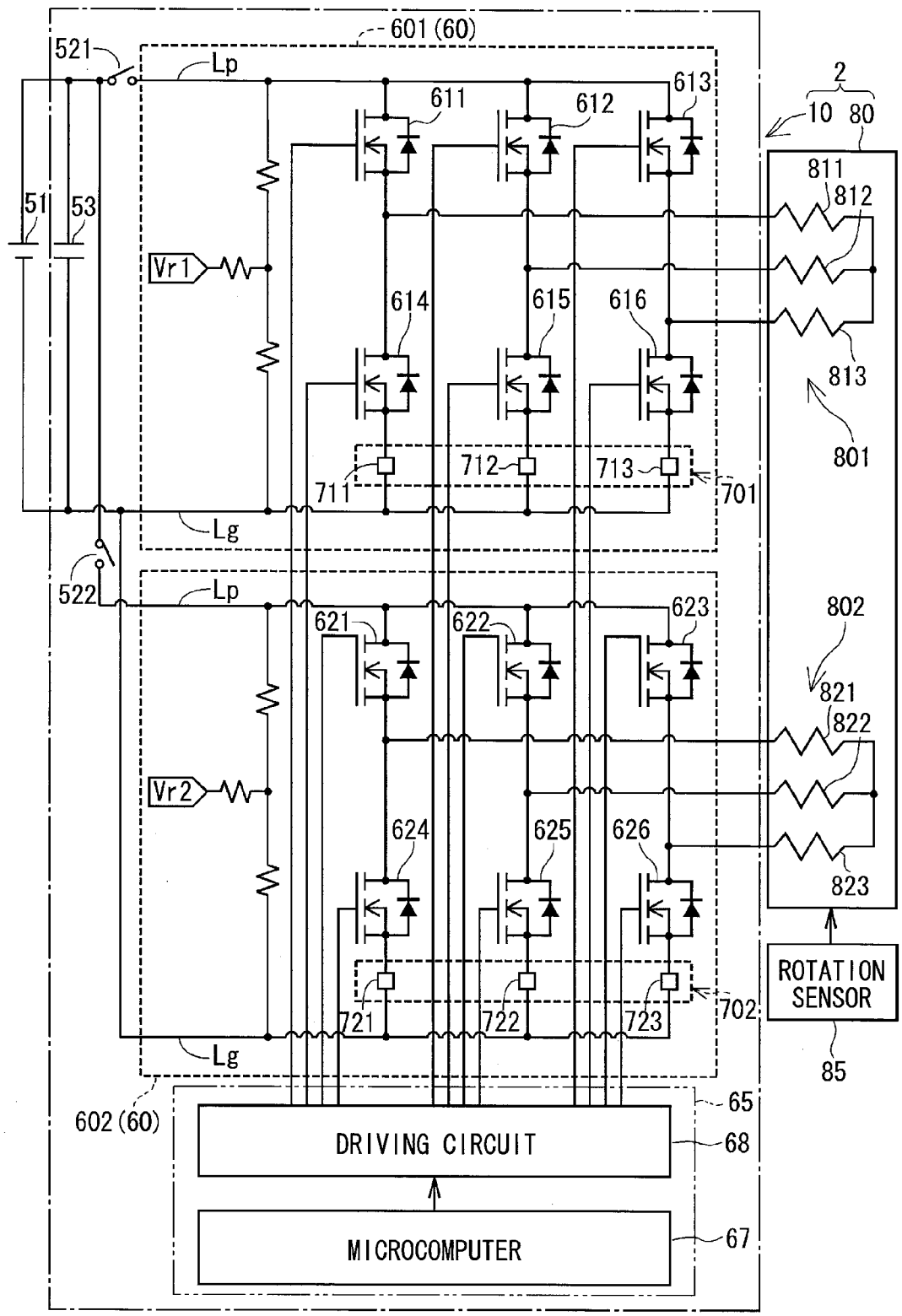
FIG. 1 is a circuit diagram of inverters controlled by a controller according to a first embodiment.

As shown in FIG. 1, the motor 80 includes a first winding set 801 and a second winding set 802. The first winding set 801 has three phase windings including a U-phase winding 811, a V-phase winding 812, and a W-phase winding 813. The second winding set 802 has three phase windings including a U-phase winding 821, a V-phase winding 822, and a W-phase winding 823. The first winding set 801 and the second winding set 802 are not electrically connected. However, the first winding set 801 and the second winding set 802 are magnetically coupled together through a magnetic circuit of the motor 80. The magnetic coupling between the first winding set 801 and the second winding set 802 is described in detail later. According to the first embodiment, the motor 80 is a non-salient-pole surface permanent magnet synchronous motor (SPMSM).

The inverter section 60 includes a first-system inverter 601 provided corresponding to the first winding set 801 and a second-system inverter 602 provided corresponding to the second winding set 802. A unit of a pair of an inverter and a corresponding winding set is hereinafter referred to as the "system". That is, a pair of the first-system inverter 601 and the first winding set 801 is hereinafter sometimes referred to as the "first system", and a pair of the second-system inverter 602 and the second winding set 802 is hereinafter sometimes referred to as the "second system".

The ECU 10 includes a first-system power relay 521, a second-system power relay 522, a capacitor 53, the first-system inverter 601, the second-system inverter 602, a first-system current sensor 701, a second-system current sensor 702, and the control section 65. The first-system current sensor 701 detects phase currents which are supplied from the first-system inverter 601 to the first winding set 801. The second-system current sensor 702 detects phase currents which are supplied from the second-system inverter 602 to the second winding set 802.

A battery 51 is a DC power source of, for example, 12 volts. The first-system power relay 521 can interrupt power supply from the battery 51 to the first-system inverter 601. The second-system power relay 522 can interrupt power supply from the battery 51 to the second-system inverter 602.

The capacitor 53 is connected in parallel to the battery 51 and stores charge. The capacitor 53 supplements the power supply to the first-system inverter 601 and the second-system inverter 602. Also, the capacitor 53 reduces noise such as a surge current.

The first-system inverter 601 includes six switching devices 611, 612, 613, 614, 615, and 616 that are connected in a bridge configuration to energize in turn the windings 811, 812, and 813 of the first winding set 801. According to the first embodiment, each of the switching devices 611-616 is a metal-oxide semiconductor field-effect transistor (MOSFET). The switching devices 611-616 are hereinafter referred to as the MOSFETs 611-616, respectively. The MOSFETs 611, 612, and 613 are located on the high potential side. The MOSFETs 611, 612, and 613 are hereinafter sometimes referred to as the "upper MOSFETs 611, 612, and 613", respectively. The MOSFETs 614, 615, and 616 are located on the low potential side. The MOSFETs 614, 615, and 616 are hereinafter sometimes referred to as the "lower MOSFETs 614, 615, and 616", respectively. The upper MOSFET 611 and the lower MOSFET 614 are connected in series to from a U-phase leg. The upper MOSFET 612 and the lower MOSFET 615 are connected in series to from a V-phase leg. The upper MOSFET 613 and the lower MOSFET 616 are connected in series to from a W-phase leg. A high potential side of each leg of the first-system inverter 601 is connected to a positive terminal of the battery 51 through an upper bus wire Lp. A low potential side of each leg of the first-system inverter 601 is connected to a negative terminal of the battery 51 through a lower bus wire Lg.

The drains of the upper MOSFETs 611, 612, and 613 are connected to the upper bus wire Lp. The sources of the upper MOSFETs 611, 612, and 613 are connected to the drains of the lower MOSFETS 614, 615, and 616, respectively. The sources of the lower MOSFETs 614, 615, and 616 are connected to the lower bus wire Lg through current sensing devices 711, 712, and 713 of the first-system current sensor 701, respectively. A connection point between the upper MOSFET 611 and the lower MOSFET 614 is connected to an end of the winding 811. A connection point between the upper MOSFET 612 and the lower MOSFET 615 is connected to an end of the winding 812. A connection point between the upper MOSFET 613 and the lower MOSFET 616 is connected to an end of the winding 813.

The current sensing devices 711, 712, and 713 detect phase currents supplied to the windings 811, 812, and 813, respectively. Further, an input voltage Vr1 is detected by a voltage divider connected between the upper bus wire Lp and the lower bus wire Lg.

The second-system inverter 602 is configured in the same manner as the first-system inverter 601. Specifically, the second-system inverter 602 includes six MOSFETs 621, 622, 623, 624, 625, and 626 that are connected in a bridge configuration to energize in turn the windings 821, 822, and 823 of the second winding set 802. The upper MOSFET 621 and the lower MOSFET 624 are connected in series to from a U-phase leg. The upper MOSFET 622 and the lower MOSFET 625 are connected in series to from a V-phase leg. The upper MOSFET 623 and the lower MOSFET 626 are connected in series to from a W-phase leg. A high potential side of each leg of the second-system inverter 602 is connected to the positive terminal of the battery 51 through the upper bus wire Lp. A low potential side of each leg of the second-system inverter 602 is connected to the negative terminal of the battery 51 through the lower bus wire Lg.

The drains of the upper MOSFETs 621, 622, and 623 are connected to the upper bus wire Lp. The sources of the upper MOSFETs 621, 622, and 623 are connected to the drains of the lower MOSFETS 624, 625, and 626, respectively. The sources of the lower MOSFETs 624, 625, and 626 are connected to the lower bus wire Lg through current sensing devices 721, 722, and 723 of the second-system current sensor 702, respectively. A connection point between the upper MOSFET 621 and the lower MOSFET 624 is connected to an end of the winding 821. A connection point between the upper MOSFET 622 and the lower MOSFET 625 is connected to an end of the winding 822. A connection point between the upper MOSFET 623 and the lower MOSFET 626 is connected to an end of the winding 823.

The current sensing devices 721, 722, and 723 detect phase currents supplied to the windings 821, 822, and 823, respectively. Further, an input voltage Vr2 is detected by a voltage divider connected between the upper bus wire Lp and the lower bus wire Lg.

The control section 65 includes a microcomputer 67 and a driving circuit 68 (i.e., pre-driver). The microcomputer 67 performs calculations necessary for control based on input signals including the torque signal and the rotation angle signal. The driving circuit 68 is connected to the gates of the MOSFETs 611-616 and 621-626. The driving circuit 68 is controlled by the microcomputer 67 and outputs switching commands to the MOSFETs 611-616 and 621-626.

The motor 80 is described in detail below with reference to FIGS. 3A, 3B, 3C, and 3D.

Figure 3A:
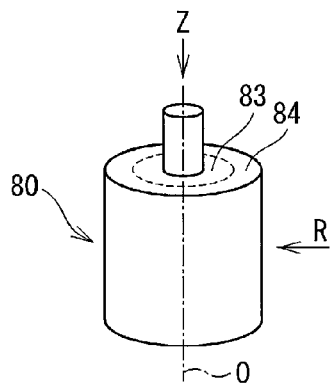
FIGS. 3A-3D are diagrams illustrating a three-phase motor driven by the controller.

As shown in FIG. 3A, the motor 80 has a rotor 83 and a stator 84. The rotor 83 rotates with respect to the stator 84 around a rotation axis θ. According to the first embodiment, the number of coils of the stator 84 is 12×m, and the number of poles of a permanent magnet 87 is 2×m, where m is a natural number (i.e., positive integer). FIGS. 3A-3D show an example where the natural number m is 2 (i.e., m=2). It is noted that the natural number m is not limited to 2.

Figure 3B:
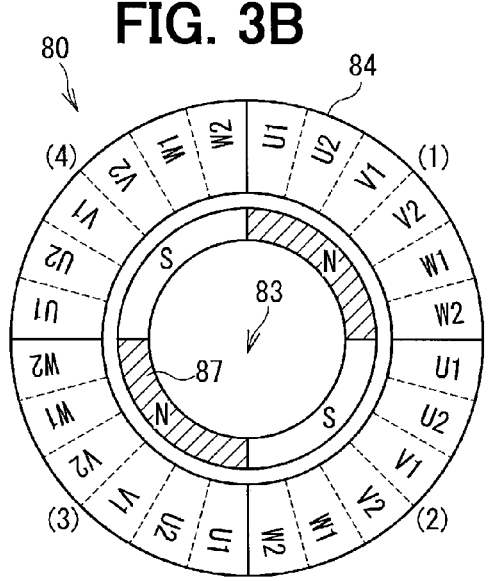

FIG. 3B is a view of the permanent magnet 87 of the rotor 83 and the stator 84 from a thrust direction Z in FIG. 3A. The permanent magnet 87 has two north poles and two south poles that are alternately arranged. Thus, the number of poles of the permanent magnet 87 is four (i.e., 2×2). A stator coil includes four coil sets, and each coil set includes six coils. That is, the number of coils of the stator 84 is twenty-four (i.e., 12×2). In each coil set, a U1 coil, a U2 coil, a V1 coil, a V2 coil, a W1 coil, and a W2 coil are arranged clockwise in this order. Two of the four coil sets provides the first winding set 801, and another two of the four coil sets provides the second winding set 802.

Figure 3C:
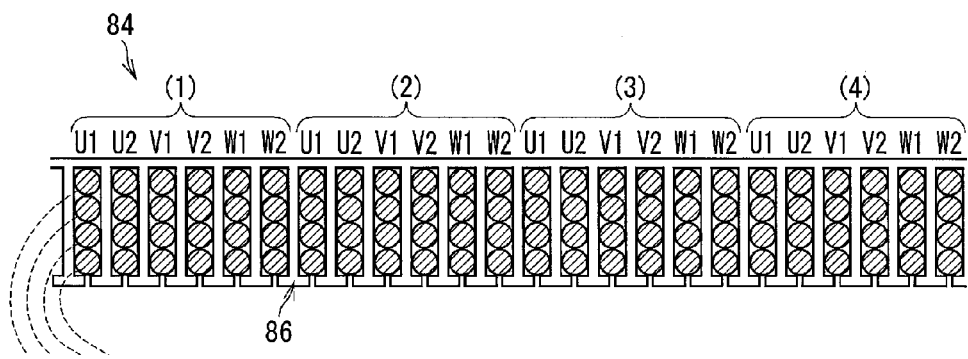
Figure 3D:
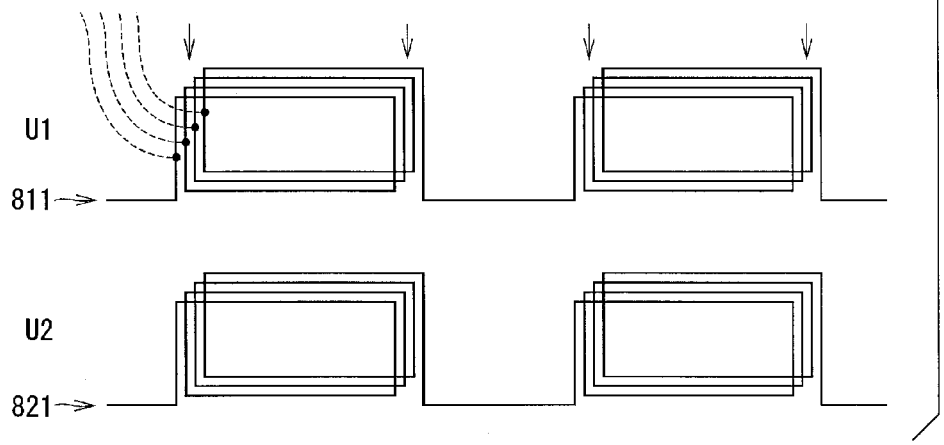

FIG. 3C is a developed view of the stator 84 from the thrust direction Z. FIG. 3D is a developed view of the windings from a radial direction R in FIG. 3A. As shown in FIGS. 3C and 3D, for example, a U1 coil 811 can be formed by winding a wire on every sixth projection 86 of the stator 84.

Thus, a position of a U2 coil 821 of the second winding set 802 with respect to the U1 coil 811 of the first winding set 801 in a circumferential direction of the stator 84 is advanced by an electrical angle of 30°. Accordingly, a phase of a three-phase AC current supplied to the second winding set 802 with respect a phase of a three-phase AC current supplied to the first winding set 801 is advanced by an angle of 30°. It is noted that an amplitude of the three-phase AC current supplied to the second winding set 802 is equal to an amplitude of the three-phase AC current supplied to the first winding set 801.

Next, the ECU 10 is described below with reference to FIG. 4. In particular, the control section 65 is described in detail.

The control section 65 has a first part and a second part. The first part of the control section 65 is provided corresponding to the first system. The second part of the control section 65 is provided corresponding to the second system. The first part of the control section 65 includes a current command calculator 151, a 2-phase to 3-phase transformer 251, a controller 301, a 2-phase to 3-phase transformer 351, and a failure detector 751. The second part of the control section 65 includes a current command calculator 152, a 2-phase to 3-phase transformer 252, a controller 302, a 2-phase to 3-phase transformer 352 and a failure detector 752.

A steering torque signal Tq* from the torque sensor 94 is inputted to each of the current command calculators 151 and 152. The current command calculator 151 calculates a d-axis current command value Id1* and a q-axis current command value Iq1* for the first system based on the steering torque signal Tq*. Likewise, the current command calculator 152 calculates a d-axis current command value Id2* and a q-axis current command value Iq2* for the second system based on the steering torque signal Tq*. Each of the d-axis current command values Id1* and Id2* is a current command value for a d-axis current (i.e., excitation current or field current) parallel to a direction of magnetic flux. Each of the q-axis current command values Iq1* and Iq2* is a current command value for a q-axis current (i.e., torque current) perpendicular to a d-axis.

A d-axis current corrector 201 is located between the current command calculator 151 and the controller 301 to correct the d-axis current command value Id1*. Likewise, a d-axis current corrector 202 is located between the current command calculator 152 and the controller 302 to correct the d-axis current command value Id2*. The d-axis current correctors 201 and 202 are described in detail later. Also, a reason why the current corrector 201 is indicted by a broken line in FIG. 4 is described later.

Next, a current feedback control performed for each system is described.

In the first system, the 2-phase to 3-phase transformer 251 converts three-phase currents Iu1, Iv1, and Iw1 detected by the current sensor 701 into a d-axis current detection value Id1 and a q-axis current detection value Iq1 based on a rotation angle θ fed back from the rotation sensor 85.

In the second system, the 2-phase to 3-phase transformer 252 converts three-phase currents Iu2, Iv2, and Iw2 detected by the current sensor 702 into a d-axis current detection value Id2 and a q-axis current detection value Iq2 based on a rotation angle (θ+30°) fed back from the rotation sensor 85.

In the first system, the controller 301 receives a difference between the d-axis current command value Id1* and the d-axis current detection value Id1 and calculates a voltage command value Vd1 in such a manner that the difference the d-axis current command value Id1* and the d-axis current detection value Id1 can converge to zero. Further, the controller 301 receives a difference between the q-axis current command value Iq1* and the q-axis current detection value Iq1 and calculates a voltage command value Vq1 in such a manner that the difference between the q-axis current command value Iq1* and the q-axis current detection value Iq1 can converge to zero. For example, the controller 301 can be a PI controller and calculate the voltage command values Vd1 and Vq1 based on a proportional gain and an integral gain.

In the second system, the controller 302 receives a difference between the d-axis current command value Id2* and the d-axis current detection value Id2 and calculates a voltage command value Vd2 in such a manner that the difference the d-axis current command value Id2* and the d-axis current detection value Id2 can converge to zero. Further, the controller 302 receives a difference between the q-axis current command value Iq2* and the q-axis current detection value Iq2 and calculates a voltage command value Vq2 in such a manner that the difference between the q-axis current command value Iq2* and the q-axis current detection value Iq2 can converge to zero. For example, the controller 302 can be a PI controller and calculate the voltage command values Vd2 and Vq2 based on a proportional gain and an integral gain.

In the first system, the 2-phase to 3-phase transformer 351 converts the two-phase voltage command values Vd1 and Vq1 into three-phase voltage command values Vu1, Vv1, and Vw1 based on the rotation angle θ fed back from the rotation sensor 85. The 2-phase to 3-phase transformer 351 outputs the voltage command values Vu1, Vv1, and Vw1 to the first-system inverter 601.

In the second system, the 2-phase to 3-phase transformer 352 converts the two-phase voltage command values Vd2 and Vq2 into three-phase voltage command values Vu2, Vv2, and Vw2 based on the rotation angle (θ+30°) fed back from the rotation sensor 85. The 2-phase to 3-phase transformer 352 outputs the voltage command values Vu2, Vv2, and Vw2 to the second-system inverter 602.

The failure detector 751 detects a failure in the first system based on the phase currents detected by the current sensor 701 and the input voltage Vr1 of the first-system inverter 601. The failure in the first system is defined as a failure that causes a braking current in the multiple-phase rotating machine. Examples of the failure in the first system include a short-circuit failure in the first-system inverter 601, a supply failure in the first winding set 801, a ground failure in the first winding set 801, and a short-circuit between the windings of the first winding set 801.

Figure 5A:
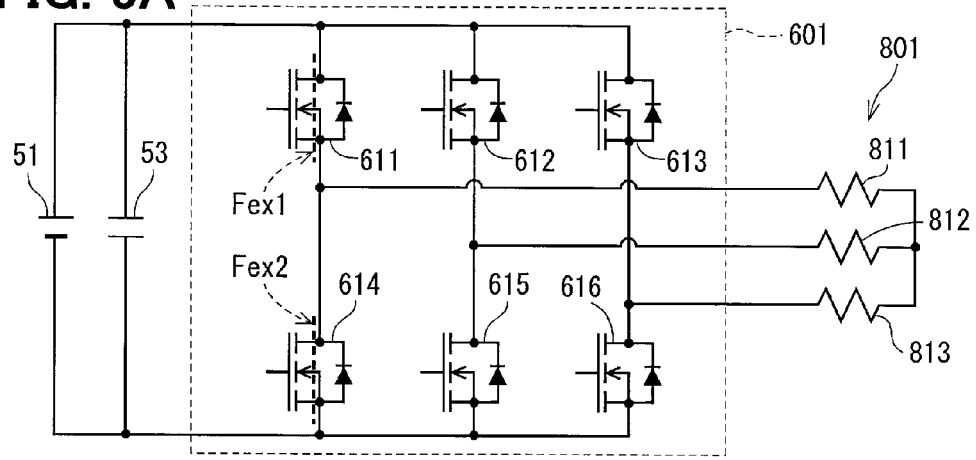
FIGS. 5A-5C are diagrams illustrating examples of failures that cause a braking current in the motor.
Figure 5B:
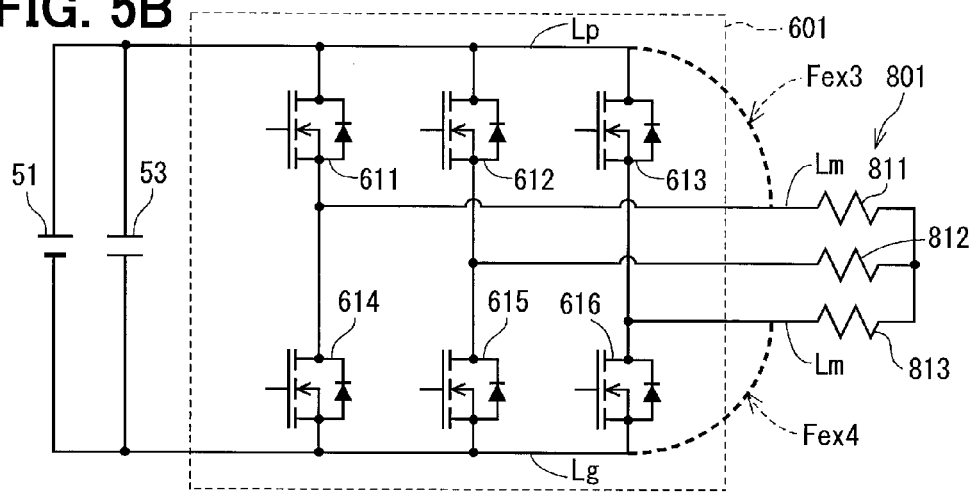
Figure 5C:
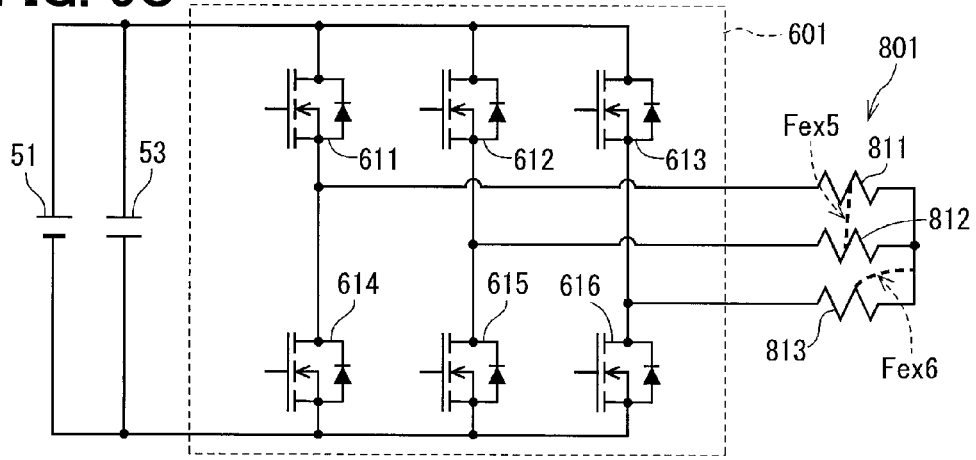

The failure detector 752 detects a failure in the second system based on the phase currents detected by the current sensor 702 and the input voltage Vr2 of the second-system inverter 602. The failure in the second system is defined as a failure that causes the braking current in the multiple-phase rotating machine. Examples of the failure in the second system include a short-circuit failure in the second-system inverter 602, a power failure in the second winding set 802, a ground failure in the second winding set 802, and a short-circuit between the windings of the second winding set 802. These failures are described in detail below with reference to FIGS. 5A-5C. FIGS. 5A-5C illustrates examples where a failure occurs in the first-system inverter 601 or the first winding set 801 in the first system.

FIG. 5A illustrates a first failure example Fex1 and a second failure example Fex2. In the first failure example Fex1, a short-circuit failure occurs in the upper MOSFET 611 so that the drain and source of the upper MOSFET 611 can remain electrically connected even upon a switching-OFF command from the driving circuit 68. In the second failure example Fex2, a short-circuit failure occurs in the lower MOSFET 614 so that the drain and source of the lower MOSFET 614 can remain electrically connected even upon a switching-OFF command from the driving circuit 68.

FIG. 5B illustrates a third failure example Fex3 and a fourth failure example Fex4. In the third failure example Fex3, a power failure occurs in the first winding set 801 so that the upper bus wire Lp can be electrically connected to a motor wire Lm that connects the first-system inverter 601 and the first winding set 801. In the fourth failure example Fex4, a ground failure occurs in the first winding set 801 so that the lower bus wire Lg can be electrically connected to the motor wire Lm.

FIG. 5C illustrates a fifth failure example Fex5 and a sixth failure example Fex6. In each of the fifth failure example Fex5 and the sixth failure example Fex6, an inner short-circuit occurs in the first winding set 801 so that portions other than ends of the windings of the first winding set 801 can be electrically connected together.

The first to sixth failure examples Fex1-Fex6 corresponds to a failure in which at least one of windings of a winding set is electrically connected to at least one of an upper bus wire connected to the high potential side of a leg and a lower bus wire connected to the low potential side of the leg.

When this type of failure occurs, an electric current path is formed as indicated by a broken line in FIGS. 5A-5C. As a result, the phase currents detected by the current sensors 701, 702 become abnormal values. The failure detectors 751 and 752 determine that the failure occurs when the phase currents detected by the current sensors 701, 702 become abnormal values.

Next, operations of the ECU 10 are described. In the ECU 10, the control section 65 controls the inverters 601 and 602 to supply power to the winding sets 801 and 802, respectively, thereby driving the motor 80. The current sensors 701 and 702 detect the phase currents which are supplied from the inverters 601 and 602 to the winding sets 801 and 802, respectively. The phase currents detected by the current sensors 701 and 702 are fed back to the control section 65. The control section 65 use the phase currents to calculate voltage commands supplied to the inverters 601 and 602.

Next, a situation where a short-circuit failure occurs in one of the inverter and the winding set in the first system or the second system is described.

Figure 4:
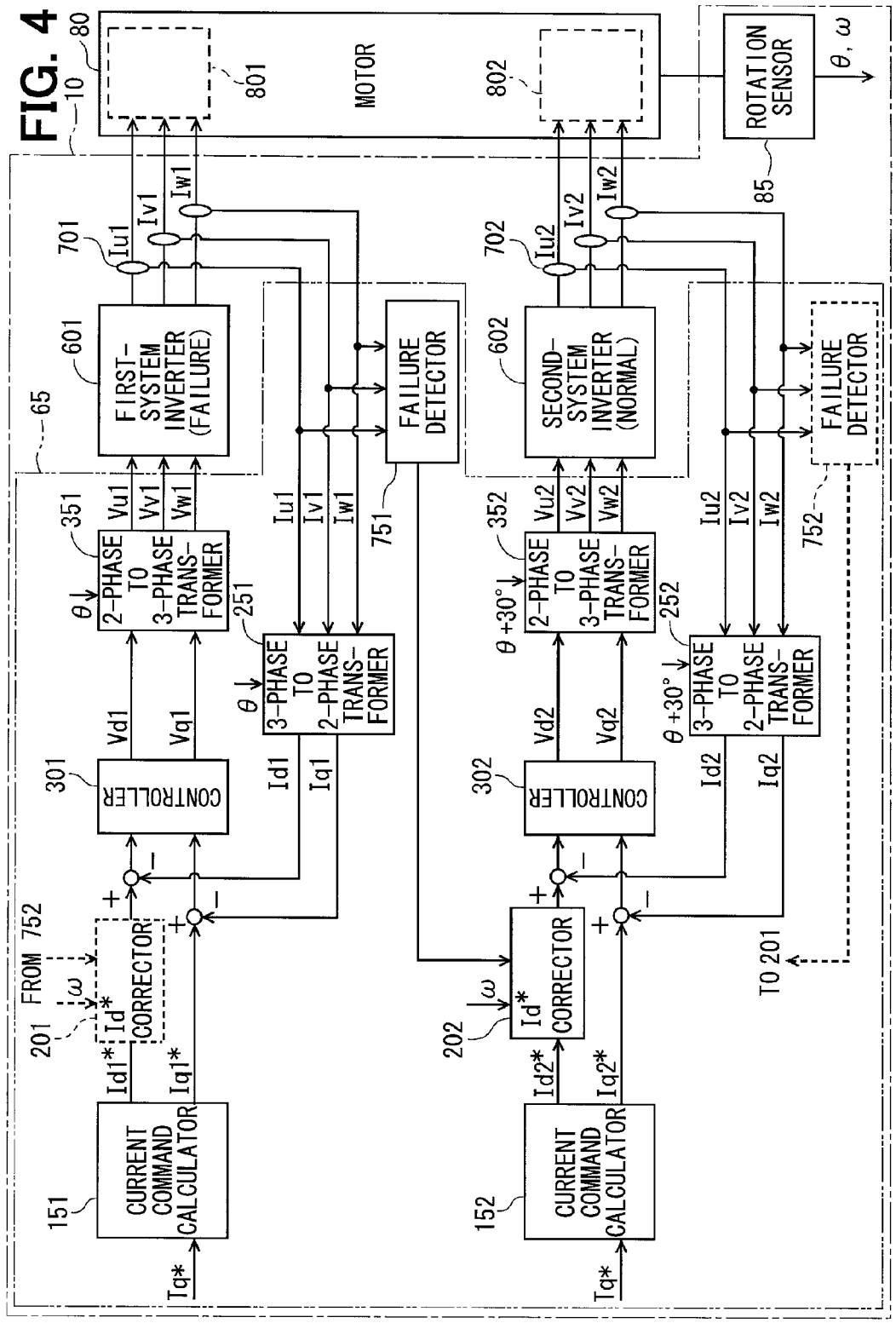
FIG. 4 is a block diagram of the controller.

Here, it is assumed that a short-circuit failure occurs in the U-phase MOSFET 611 of the first-system inverter 601 in the first system under a condition that no failure occurs in the second system (refer to FIG. 4). In this case, the failure detector 751 detects a short-circuit failure in the first system based on the phase currents Iu1, Iv1, and Iw1 detected by the current sensor 701.

When the failure detector 751 detects the short-circuit failure, the failure detector 751 sets the current command values to zero or turns OFF all MOSFETs. Alternatively, the failure detector 751 can turn OFF the power relay 521 upon the detection of the short-circuit failure, thereby interrupting power supply from the battery 51 to the first-system inverter 601.

In this case, the motor 80 remains driven by the second-system inverter 602 in the normal second system. As a result, a braking current, due to a counter-electromotive force in the motor 80 or due to a mutual inductance between the first and second systems, flows through the motor 80 so that braking torque against driving torque of the motor 80 can be produced. Further, an electric current flowing through the first-system inverter 601 and the first winding set 801 in the first system may cause heat generation and torque ripple.

Figure 6:
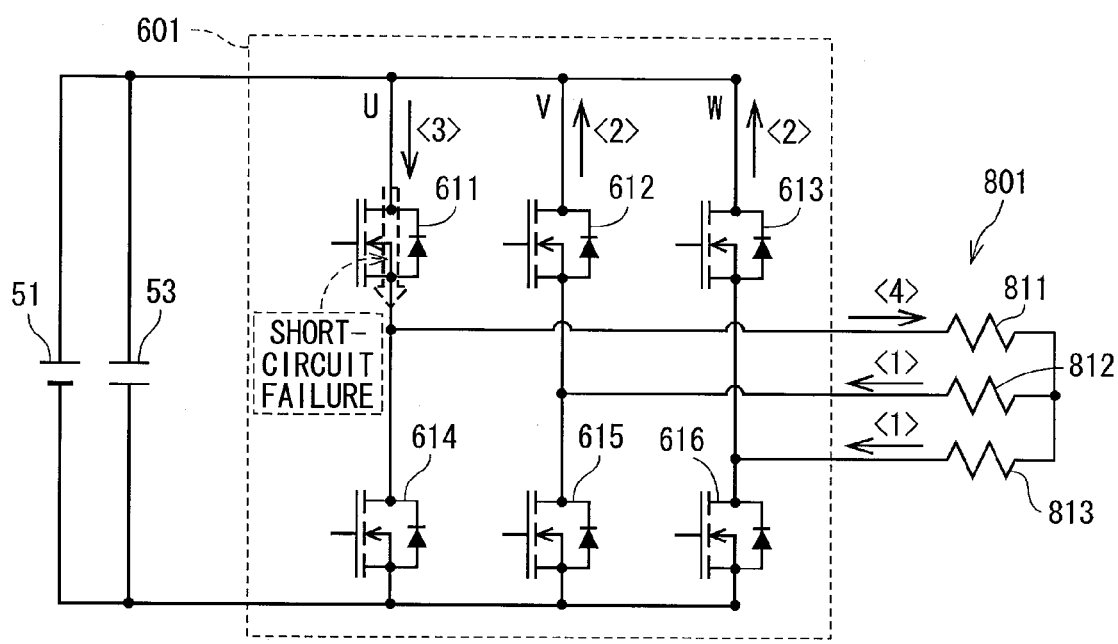
FIG. 6 is a diagram illustrating an electric current flowing when a short-circuit failure occurs in a upper MOSFET.

FIG. 6 shows a principle on which a counter-electromotive force causes an electric current in the first-system inverter 601 in the first system, when a short-circuit failure occurs in the U-phase MOSFET 611 of the first-system inverter 601. In FIG. 6, the MOSFET 611 fails, but the other MOSFETs 612-616 are normal. In this case, an electric current caused by a counter-electromotive force flows as follows. Firstly, as indicated by an arrow <1>, the electric current flows through the V-phase winding 812 and the W-phase winding 813. Then, as indicated by an arrow <2>, the electric current flows through parasitic diodes of the V-phase upper MOSFET 612 and the W-phase upper MOSFET 613. Then, as indicated by an arrow <3>, the electric current flows through the U-phase upper MOSFET 611 which suffers from the short-circuit failure. Then, as indicated by an arrow <4>, the electric current flows through the U-phase winding 811.

According to the first embodiment, based on a mutual inductance between the first winding set 801 and the second winding set 802, the ECU 10 reduces the electric current flowing through the failed first system when the motor 80 remains driven by the normal second system. A reason for this is that, since the first winding set 801 and the second winding set 802 are magnetically coupled together, there is a need to take into account not only a self-inductance but also a mutual inductance between the systems (refer to, for example, US 2003/0085683A corresponding to JP-A-2003-153585).

Figure 7:
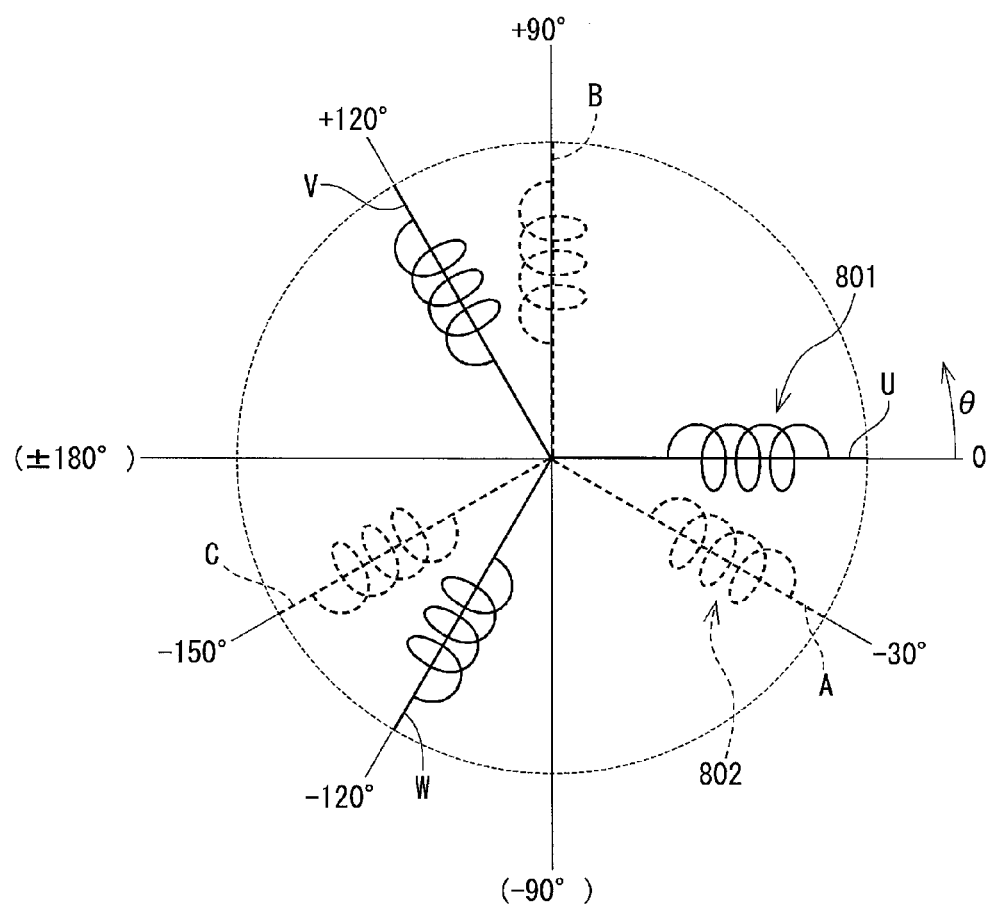
FIG. 7 is a diagram used to consider a mutual inductance of a two-system three-phase motor.

A dq-axis voltage equation containing a mutual inductance between the first system and the second system is explained below with reference to a model shown in FIG. 7. In FIG. 7, "U", "V", and "W" represent a U-phase, V-phase, and a W-phase of the first winding set 801 of the first system, respectively. In FIG. 7, "A", "B", and "C" represent a U-phase, a V-phase, and a W-phase of the second winding set 802 of the second system, respectively. To distinguish the first system and the second system from each other, the U-phase, the V-phase, and the W-phase of the second winding set 802 are hereinafter referred to as the "A-phase", the "B-phase", and the "C-phase", respectively. As shown in FIG. 7, the A-phase is displaced from the U-phase by the electrical angle of −30°. That is, the A-phase advances in phase by 30° from the U-phase.

In the model shown in FIG. 7, a magnetic flux A in each phase is given by a formula (1) below.

$$\begin{bmatrix} \lambda_U \\ \lambda_V \\ \lambda_W \end{bmatrix} = \begin{bmatrix} L_U & M_{UV} & M_{UW} \\ M_{VU} & L_V & M_{VW} \\ M_{WU} & M_{WV} & L_W \end{bmatrix} \begin{bmatrix} I_U \\ I_V \\ I_W \end{bmatrix} + \begin{bmatrix} M_{UA} & M_{UB} & M_{UC} \\ M_{VA} & M_{VB} & M_{VC} \\ M_{WA} & M_{WB} & M_{WC} \end{bmatrix} \begin{bmatrix} I_A \\ I_B \\ I_C \end{bmatrix} + \phi_0 \begin{bmatrix} \cos(\theta) \\ \cos(\theta - 120) \\ \cos(\theta + 120) \end{bmatrix} \quad (1)$$

In the formula (1), L represents a self-inductance of each phase, M represents a mutual inductance between phases in the same system or in the different systems, I represents a phase current, and $\Phi_0$ represents armature interlinkage magnetic flux. For example, $\lambda_U$ represents a magnetic flux in the U-phase, $L_U$ represents a self-inductance of the U-phase, $M_{UV}$ represents a mutual inductance between the U-phase and the V-phase of the first system, $M_{UA}$ represents a mutual inductance between the U-phase of the first system and the A-phase of the second system, and $I_U$ represents a phase current of the U-phase.

Formulas (2) and (3) are given by rewriting the formula (1) in such a manner that the self-inductance L of each of the U-phase, the V-phase, and the W-phase is defined as L' (i.e., $L'=L_U=L_V=L_W$), a coupling factor between the first and second systems is defined as a, and a coupling factor in each of the first and second systems is defined as b. It is noted that a unit of angle "°" is sometimes omitted in the following formulas and description.

$$\begin{bmatrix} L_U & M_{UV} & M_{UW} \\ M_{VU} & L_V & M_{VW} \\ M_{WU} & M_{WV} & L_W \end{bmatrix} = \begin{bmatrix} L' & -\frac{1}{2}bL' & -\frac{1}{2}bL' \\ -\frac{1}{2}bL' & L' & -\frac{1}{2}bL' \\ -\frac{1}{2}bL' & -\frac{1}{2}bL' & L' \end{bmatrix} \quad (2)$$

$$\begin{bmatrix} M_{UA} & M_{UB} & M_{UC} \\ M_{VA} & M_{VB} & M_{VC} \\ M_{WA} & M_{WB} & M_{WC} \end{bmatrix} = \begin{bmatrix} \frac{\sqrt{3}}{2}aL' & 0 & -\frac{\sqrt{3}}{2}aL' \\ -\frac{\sqrt{3}}{2}aL' & \frac{\sqrt{3}}{2}aL' & 0 \\ 0 & -\frac{\sqrt{3}}{2}aL' & \frac{\sqrt{3}}{2}aL' \end{bmatrix} \quad (3)$$

In the formula (2), for example, since the V-phase is displaced from the U-phase by +120, $M_{UV}$ can be represented as follows: $M_{UV}=bL'\cos(120)=-(1/2)bL'$.

Likewise, for example, since the W-phase is displaced from the U-phase by −120, $M_{UW}$ can be represented as follows: $M_{UW}=bL'\cos(-120)=-(1/2)bL'$.

In the formula (3), for example, since the A-phase is displaced from the U-phase by −30, $M_{UA}$ can be represented as follows: $M_{UA}=aL'\cos(-30)=(\sqrt{3}/2)aL'$.

Likewise, for example, since the B-phase is displaced from the U-phase by +90, $M_{UB}$ can be represented as follows: $M_{UB}=aL'\cos(90)=0$.

Likewise, for example, since the C-phase is displaced from the U-phase by −150, $M_{UC}$ can be represented as follows: $M_{UC}=aL'\cos(-150)=-(\sqrt{3}/2)aL'$.

The right-hand side of the formula (2) can be rewritten into a formula (4) by adding (1/2)bL' to each element of a matrix in the right-hand side of the formula (2).

$$\begin{bmatrix} L' & -\frac{1}{2}bL' & -\frac{1}{2}bL' \\ -\frac{1}{2}bL' & L' & -\frac{1}{2}bL' \\ -\frac{1}{2}bL' & -\frac{1}{2}bL' & L' \end{bmatrix} = \quad (4)$$

$$\begin{bmatrix} L' & 0 & 0 \\ 0 & L' & 0 \\ 0 & 0 & L' \end{bmatrix} + \begin{bmatrix} \frac{1}{2}bL' & 0 & 0 \\ 0 & \frac{1}{2}bL' & 0 \\ 0 & 0 & \frac{1}{2}bL' \end{bmatrix} = \left(L' + \frac{1}{2}bL'\right)$$

The formula (1) can be rewritten into a formula (5) by using the formulas (3) and (4).

$$\begin{bmatrix} \lambda_U \\ \lambda_V \\ \lambda_W \end{bmatrix} = \left(L' + \frac{1}{2}bL'\right) \begin{bmatrix} I_U \\ I_V \\ I_W \end{bmatrix} + \quad (5)$$

$$aL' \begin{bmatrix} \frac{\sqrt{3}}{2} & 0 & -\frac{\sqrt{3}}{2} \\ -\frac{\sqrt{3}}{2} & \frac{\sqrt{3}}{2} & 0 \\ 0 & -\frac{\sqrt{3}}{2} & \frac{\sqrt{3}}{2} \end{bmatrix} \begin{bmatrix} I_A \\ I_B \\ I_C \end{bmatrix} + \phi_0 \begin{bmatrix} \cos(\theta) \\ \cos(\theta - 120) \\ \cos(\theta + 120) \end{bmatrix}$$

A formula (6) is given by adding a term of a product of a resistance R and a current I to a derivative of the formula (5) with respect to time.

$$\begin{bmatrix} V_U \\ V_V \\ V_W \end{bmatrix} = R \begin{bmatrix} I_U \\ I_V \\ I_W \end{bmatrix} + \left(L' + \frac{1}{2}bL'\right) \begin{bmatrix} \frac{dI_U}{dt} \\ \frac{dI_V}{dt} \\ \frac{dI_W}{dt} \end{bmatrix} + \quad (6)$$

$$aL' \begin{bmatrix} \frac{\sqrt{3}}{2} & 0 & -\frac{\sqrt{3}}{2} \\ -\frac{\sqrt{3}}{2} & \frac{\sqrt{3}}{2} & 0 \\ 0 & -\frac{\sqrt{3}}{2} & \frac{\sqrt{3}}{2} \end{bmatrix} \begin{bmatrix} \frac{dI_A}{dt} \\ \frac{dI_B}{dt} \\ \frac{dI_C}{dt} \end{bmatrix} + \omega\phi_0 \begin{bmatrix} -\sin(\theta) \\ -\sin(\theta - 120) \\ -\sin(\theta + 120) \end{bmatrix}$$

It is noted that the dimension of the magnetic flux A is a product of a voltage and a time (i.e., V·s). Therefore, a derivative of the magnetic flux λ with respect to time becomes a voltage V. Further, the electrical angle θ is represented by using an angular velocity ω as follows: θ=ωt. Therefore, a derivative of cos(θ) with respect to time is given as follows: d cos(θ)/dt=−ω sin(θ).

A formula (7.1) represents a rotation matrix $X_\theta$ for a dq transformation (i.e., three-phase to two-phase transformation) for the U-phase, the V-phase, and the W-phase of the first system. A formula (7.2) represents a rotation matrix $X_{(\theta+30)}$ for a dq transformation for the A-phase, the B-phase, and the C-phase of the second system. The formula (7.2) is given by substituting ($\theta$+30) for $\theta$ in the formula (7.1).

$$X_\theta = \begin{bmatrix} \cos(\theta) & \cos(\theta-120) & \cos(\theta+120) \\ -\sin(\theta) & -\sin(\theta-120) & -\sin(\theta+120) \end{bmatrix} \quad (7.1)$$

$$X_{\theta+30} = \begin{bmatrix} \cos(\theta+30) & \cos(\theta-90) & \cos(\theta+150) \\ -\sin(\theta+30) & -\sin(\theta-90) & -\sin(\theta+150) \end{bmatrix} \quad (7.2)$$

A d-q transformation of three-phase voltage vectors of each system is given by formulas (8.1) and (8.2).

$$\begin{bmatrix} V_{d1} \\ V_{q1} \end{bmatrix} = X_\theta \begin{bmatrix} V_U \\ V_V \\ V_W \end{bmatrix}, \quad (8.1)$$

$$\begin{bmatrix} V_{d2} \\ V_{q2} \end{bmatrix} = X_{\theta+30} \begin{bmatrix} V_A \\ V_B \\ V_C \end{bmatrix} \quad (8.2)$$

Likewise, a d-q transformation of three-phase current vectors of each system is given by formulas (9.1) and (9.2).

$$\begin{bmatrix} I_{d1} \\ I_{q1} \end{bmatrix} = X_\theta \begin{bmatrix} I_U \\ I_V \\ I_W \end{bmatrix}, \quad (9.1)$$

$$\begin{bmatrix} I_{d2} \\ I_{q2} \end{bmatrix} = X_{\theta+30} \begin{bmatrix} I_A \\ I_B \\ I_C \end{bmatrix} \quad (9.2)$$

A formula (10) is given by multiplying each term of the formula (6) by the rotation matrix $X_\theta$.

$$\begin{bmatrix} V_{d1} \\ V_{q1} \end{bmatrix} = \underbrace{R \begin{bmatrix} I_{d1} \\ I_{q1} \end{bmatrix}}_{1st} + \underbrace{\left(L' + \frac{1}{2}bL'\right)X_\theta \begin{bmatrix} \frac{dI_U}{dt} \\ \frac{dI_V}{dt} \\ \frac{dI_W}{dt} \end{bmatrix}}_{\substack{(11o) \\ 2nd}} + \quad (10)$$

$$\underbrace{aL'X_\theta \begin{bmatrix} \frac{\sqrt{3}}{2} & 0 & -\frac{\sqrt{3}}{2} \\ -\frac{\sqrt{3}}{2} & \frac{\sqrt{3}}{2} & 0 \\ 0 & -\frac{\sqrt{3}}{2} & \frac{\sqrt{3}}{2} \end{bmatrix} \begin{bmatrix} \frac{dI_A}{dt} \\ \frac{dI_B}{dt} \\ \frac{dI_C}{dt} \end{bmatrix}}_{\substack{(12o) \\ 3rd}} + \underbrace{\omega\phi_0 X_\theta \begin{bmatrix} -\sin(\theta) \\ -\sin(\theta-120) \\ -\sin(\theta+120) \end{bmatrix}}_{\substack{(14o) \\ 4th}} \quad$$

Here, it is noted that each of the rotation matrix $X_\theta$ and a current matrix I is a function of time. The following relationship is derived from a derivative of a composite function of the rotation matrix $X_\theta(t)$ and a current matrix I(t): $X_\theta(t) \cdot \{I(t)\}' = \{X_\theta(t) \cdot I(t)\} - \{X_\theta(t)\}' \cdot I(t)$ Therefore, a part (11o) of the 2nd term of the formula (10) can be calculated as shown in a formula (11). A rotation matrix, which has a form created by interchanging the first row vector with the second row of the rotation matrix $X_\theta$, appears in the latter part of the calculation. Therefore, the 2nd term of the formula (11) contains a column vector having a form created by interchanging Id1 with Iq1 in the formula (9.1).

$$X_\theta \begin{bmatrix} \frac{dI_U}{dt} \\ \frac{dI_V}{dt} \\ \frac{dI_W}{dt} \end{bmatrix} = \frac{d}{dt}\left(X_\theta \begin{bmatrix} I_U \\ I_V \\ I_W \end{bmatrix}\right) - \quad (11)$$

$$\left(\frac{d}{dt}\begin{bmatrix} \cos(\theta) & \cos(\theta-120) & \cos(\theta+120) \\ -\sin(\theta) & -\sin(\theta-120) & -\sin(\theta+120) \end{bmatrix}\right)\begin{bmatrix} I_U \\ I_V \\ I_W \end{bmatrix}$$

$$= \frac{d}{dt}\begin{bmatrix} I_{d1} \\ I_{q1} \end{bmatrix} - \omega\begin{bmatrix} -\sin(\theta) & -\sin(\theta-120) & -\sin(\theta+120) \\ -\cos(\theta) & -\cos(\theta-120) & -\cos(\theta+120) \end{bmatrix}\begin{bmatrix} I_U \\ I_V \\ I_W \end{bmatrix}$$

$$= \frac{d}{dt}\begin{bmatrix} I_{d1} \\ I_{q1} \end{bmatrix} + \omega\begin{bmatrix} \sin(\theta) & \sin(\theta-120) & \sin(\theta+120) \\ -\cos(\theta) & -\cos(\theta-120) & -\cos(\theta+120) \end{bmatrix}\begin{bmatrix} I_U \\ I_V \\ I_W \end{bmatrix}$$

$$= \frac{d}{dt}\begin{bmatrix} I_{d1} \\ I_{q1} \end{bmatrix} + \begin{bmatrix} -\omega I_{q1} \\ \omega I_{d1} \end{bmatrix}$$

As shown in a formula (11), a (12o) part of the 3rd term of the formula (10) can be calculated by using the addition theorem of trigonometric functions and becomes equal to 3/2 times of the rotation matrix $X_{(\theta+30)}$.

$$\begin{bmatrix} \cos(\theta) & \cos(\theta-120) & \cos(\theta+120) \\ -\sin(\theta) & -\sin(\theta-120) & -\sin(\theta+120) \end{bmatrix}\begin{bmatrix} \frac{\sqrt{3}}{2} & 0 & -\frac{\sqrt{3}}{2} \\ -\frac{\sqrt{3}}{2} & \frac{\sqrt{3}}{2} & 0 \\ 0 & -\frac{\sqrt{3}}{2} & \frac{\sqrt{3}}{2} \end{bmatrix} = \quad (12)$$

$$\frac{\sqrt{3}}{2}\begin{bmatrix} \cos(\theta)-\cos(\theta-120) & \cos(\theta-120)-\cos(\theta+120) & -\cos(\theta)+\cos(\theta+120) \\ -\sin(\theta)+\sin(\theta-120) & -\sin(\theta-120)+\sin(\theta+120) & \sin(\theta)-\sin(\theta-120) \end{bmatrix} =$$

-continued $$\frac{3}{2}\begin{bmatrix} \cos(\theta+30) & \cos(\theta-90) & \cos(\theta+150) \\ -\sin(\theta+30) & -\sin(\theta-90) & -\sin(\theta+150) \end{bmatrix} = \frac{3}{2}X_{\theta+30}$$

A product of the rotation matrix $X_{(\theta+30)}$ and a column vector of derivatives of current with respect to time is given by a formula (13) in the same manner as discussed above for the formula (11).

$$X_{\theta+30}\begin{bmatrix} \frac{dI_A}{dt} \\ \frac{dI_B}{dt} \\ \frac{dI_C}{dt} \end{bmatrix} = \frac{d}{dt}\begin{bmatrix} I_{d2} \\ I_{q2} \end{bmatrix} + \begin{bmatrix} -\omega I_{q2} \\ \omega I_{d2} \end{bmatrix} \quad (13)$$

As shown in a formula (14), a (14o) part of the 4th term of the formula (10) can be calculated by using the addition theorem of trigonometric functions.

$$\begin{bmatrix} \cos(\theta) & \cos(\theta-120) & \cos(\theta+120) \\ -\sin(\theta) & -\sin(\theta-120) & -\sin(\theta+120) \end{bmatrix} \quad (14)$$

$$\begin{bmatrix} -\sin(\theta) \\ -\sin(\theta-120) \\ -\sin(\theta+120) \end{bmatrix} = \begin{bmatrix} 0 \\ \frac{3}{2} \end{bmatrix} = \frac{3}{2}\begin{bmatrix} 0 \\ 1 \end{bmatrix}$$

From the formulas (11)-(14), the formula (10) can be rewritten into a formula (15).

$$\begin{bmatrix} V_{d1} \\ V_{q1} \end{bmatrix} = R\begin{bmatrix} I_{d1} \\ I_{q1} \end{bmatrix}_{\text{1st}} + \underbrace{\left(L' + \frac{1}{2}bL'\right)}_{=L}\left(\frac{d}{dt}\begin{bmatrix} I_{d1} \\ I_{q1} \end{bmatrix} + \begin{bmatrix} -\omega I_{q1} \\ \omega I_{d1} \end{bmatrix}\right)_{\text{2nd}} + \quad (15)$$

$$\underbrace{\frac{3}{2}aL'}_{=M}\left(\frac{d}{dt}\begin{bmatrix} I_{d2} \\ I_{q2} \end{bmatrix} + \begin{bmatrix} -\omega I_{q2} \\ \omega I_{d2} \end{bmatrix}\right) + \omega \times \underbrace{\frac{3}{2}\phi_0}_{=Ke}\begin{bmatrix} 0 \\ 1 \end{bmatrix}$$

Here, the coefficient of the 2nd term of the formula (15) is substituted as follows: $L'+(1/2)bL'=L$, where L is a self-inductance.

Further, the coefficient of the 3rd term of the formula (15) is substituted as follows: $(3/2)aL'=M$, where M is a mutual inductance.

Further, the coefficient of the 4th term of the formula (15) is substituted as follows: $(3/2)\Phi_0=Ke$, where Ke is a counter-electromotive force constant.

Further, the time derivative (d/dt) in the formula (15) is replaced with a Laplace variable(s). Thus, a formula (16), which is a voltage equation for the first system, is obtained.

$$\begin{bmatrix} V_{d1} \\ V_{q1} \end{bmatrix} = R\begin{bmatrix} I_{d1} \\ I_{q1} \end{bmatrix} + L\times\left(s\begin{bmatrix} I_{d1} \\ I_{q1} \end{bmatrix} + \begin{bmatrix} -\omega I_{q1} \\ \omega I_{d1} \end{bmatrix}\right) + \quad (16)$$

$$M\times\left(s\begin{bmatrix} I_{d2} \\ I_{q2} \end{bmatrix} + \begin{bmatrix} -\omega I_{q2} \\ \omega I_{d2} \end{bmatrix}\right) + \omega \times Ke\begin{bmatrix} 0 \\ 1 \end{bmatrix}$$

As mentioned previously, according to the first embodiment, the motor 80 is a non-salient-pole surface permanent magnet synchronous motor (SPMSM). Therefore, a d-axis self-inductance Ld is equal to a q-axis self-inductance Lq. Each of the d-axis self-inductance Ld and the q-axis self-inductance Lq is hereinafter referred to as the "self-inductance L". That is, Ld=Lq=L. Likewise, a d-axis mutual inductance Md is equal to a q-axis mutual inductance Mq. Each of the d-axis mutual inductance Md and the q-axis mutual inductance Mq is hereinafter referred to as the "mutual inductance M". That is, Md=Mq=M.

The formula (16), which is represented in a matrix form, can be decomposed into formulas 17 and 18.

$$Vq1=R\times Iq1+Ls\times Iq1+\omega\times L\times Id1+Ms\times Iq2+\omega\times M\times Id2+ \omega\times Ke \quad (17)$$

$$Vd1=R\times Id1+Ls\times Id1-\omega\times L\times Iq1+Ms\times Id2-\omega\times M\times Iq2 \quad (18)$$

Figure 8A:
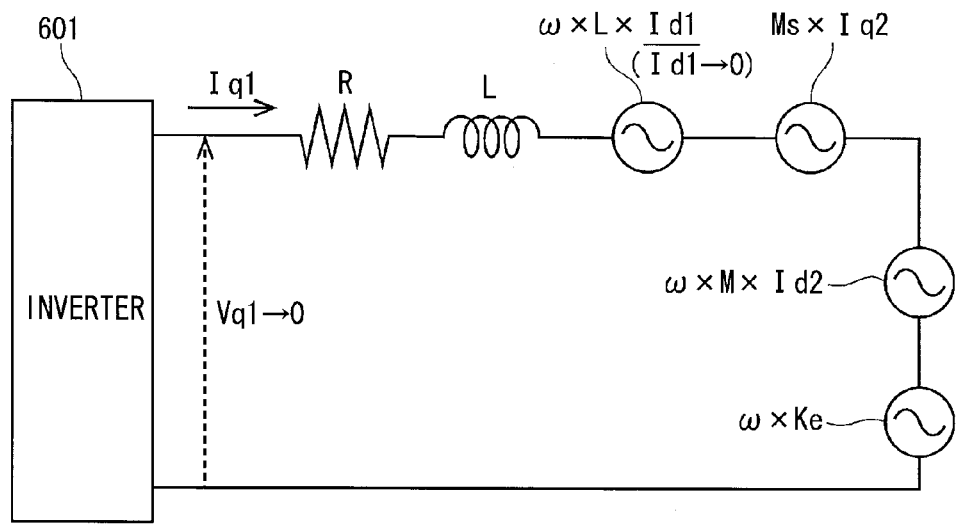
FIG. 8A is a diagram illustrating an equivalent circuit regarding a q-axis voltage in an inverter in a failed system.
Figure 8B:
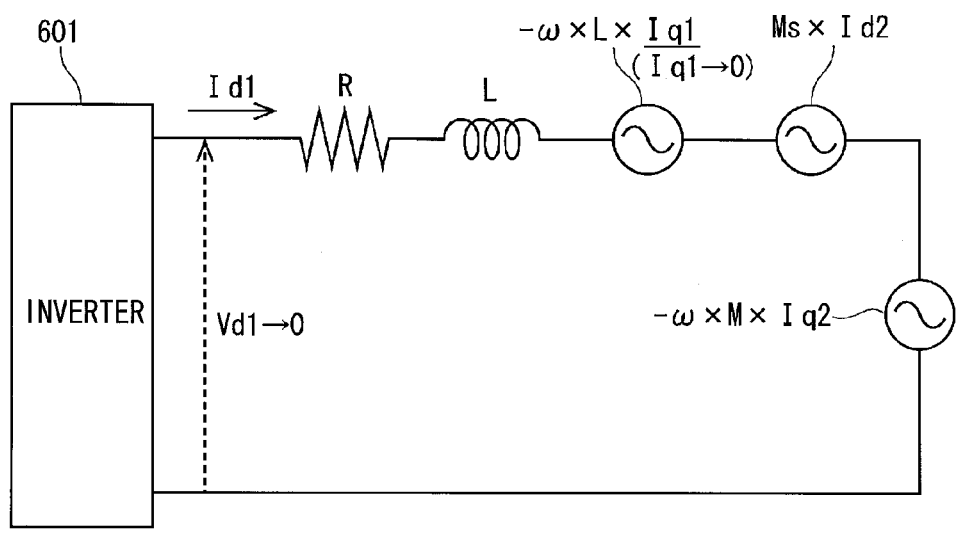
FIG. 8B is a diagram illustrating an equivalent circuit regarding a d-axis voltage in the inverter in the failed system.

FIG. 8A shows an equivalent circuit corresponding to the formula (17), and FIG. 8B shows an equivalent circuit corresponding to the formula (18).

Assuming that the first-system inverter 601 stops operating due to a short-circuit failure, Vq1=0, and Id=0. Therefore, a formula (19.1) of a q-axis current Iq1 can be obtained from the formula (17).

$$Iq1=\{Ms\times Iq2+\omega\times(M\times Id2+Ke)\}/(R+Ls) \quad (19.1)$$

The formula (19.1) can be rewritten into a formula (19.2) by ignoring the term of Ms, which is a transient part.

$$Iq1\approx\{\omega\times M\times Id2+\omega\times Ke)\}/(R+Ls) \quad (19.2)$$

Likewise, since Vd1=0, and Iq1=0, a formula (20.1) regarding the d-axis current Id1 can be obtained from the formula (18).

$$Id1=(Ms\times Id2-\omega\times M\times Iq2)/(R+Ls) \quad (20.1)$$

The formula (20.1) can be rewritten into a formula (20.2) by ignoring the term of Ms, which is a transient part.

$$Id1\approx(-\omega\times M\times Iq2)/(R+Ls) \quad (20.2)$$

As can be understood from the formulas (19.2) and (20.2), although the first-system inverter 601 in the failed first system stops operating, the current Id2 flows in the normal second system so that a voltage due to the current Id2 can be generated. As a result, an electric current flows in the failed first system.

According to the first embodiment, as shown in FIG. 4, when the failure detector 751 detects a failure in the first-system inverter 601 or the first winding set 801, the control section 65 controls the current command supplied to the second-system inverter 602 in such a manner that the current in the failed first system can be reduced. Specifically, in order to reduce the term of ω×Ke in the formula 19.2, the d-axis current corrector 202 corrects the d-axis current command value Id2* so that the d-axis current Id2 in the normal second system can increase in a negative direction.

In principle, the q-axis current Iq2 in the formula (20.2) is kept unchanged, because the q-axis current Iq2 may affect the torque of the motor 80.

In FIG. 4, the d-axis current corrector 202 is provided as a separate component. Alternatively, for example, the d-axis current corrector 202 can be incorporated in the current command calculator 152.

The above explanation is based on the assumption that a short-circuit failure occurs in the first-system inverter 601 in the first system under a condition that the second-system inverter 602 in the second system is normal. The ECU 10 can operate in the same manner as explained above, when a short-circuit failure occurs in the second-system inverter 602 in the second system under a condition that the first-system inverter 601 in the first system is normal. That is, as indicated by a broken line in FIG. 4, when the failure detector 752 detects the failure in the second system, the d-axis current corrector 201 corrects the d-axis current command value Id1* so that the d-axis current Id1 in the normal first system can increase in the negative direction.

Figure 9:
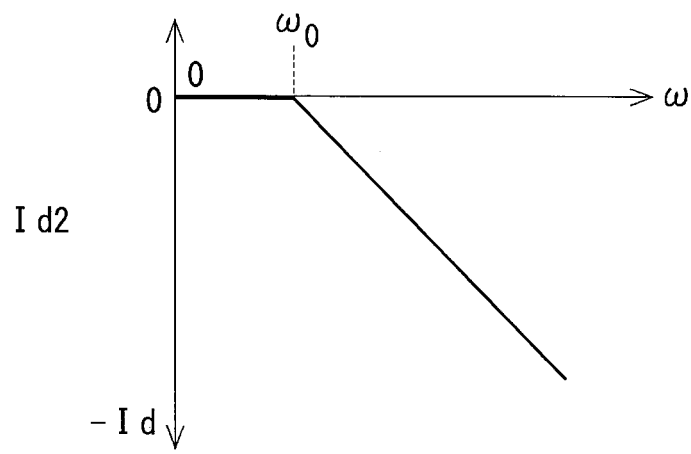
FIG. 9 is a diagram illustrating a relationship between a d-axis current in a normal system and an angular velocity of the motor.

Further, according to the first embodiment, the d-axis current command value Id2* in the normal system is set so that the d-axis current Id2 can depend on the angular velocity ω of the motor 80. Specifically, as shown in FIG. 9, when the angular velocity ω is less than a predetermined threshold ω0, the d-axis current command value Id2* is set so that the d-axis current Id2 can be zero. In contrast, when the angular velocity ω exceeds the threshold ω0, the d-axis current command value Id2* is set so that the d-axis current Id2 can change in proportion to a difference (ω−ω0) between the angular velocity ω and the threshold ω0.

When the angular velocity ω is less than the threshold ω0, both the term of M×Id2 and the term of Ke in the formula 19.2 are so small that heat generation and torque ripple caused by an electric current in the failed system can be negligible. Therefore, when the angular velocity ω is less than the threshold ω0, there is no need to supply the d-axis current in the normal system. In contrast, when the angular velocity ω exceeds the threshold ω0, the negative d-axis current is supplied to the normal system so that the term of M×Id2 in the formula 19.2 can become a negative value. Thus, the term of Ke, which is a counter-electromotive force constant, is canceled so that heat generation and torque ripple due to the electric current in the failed system can be reduced.

Therefore, for example, the ECU 10 can be effectively used for the electric power steering apparatus 1 which needs to continue a stable operation to assist a driver in steering.

Second Embodiment

A second embodiment of the present disclosure is described below with reference to FIG. 10. Like in the first embodiment, the d-axis current command value Id2* in the normal system is set so that the d-axis current Id2 can depend on the angular velocity ω of the motor 80. Specifically, according to the second embodiment, when the angular velocity ω is less than a predetermined threshold ω0, the d-axis current command value Id2* is set so that the d-axis current Id2 can become zero. In contrast, when the angular velocity ω exceeds the threshold ω0, the d-axis current command value Id2* is set so that the d-axis current Id2 can have a predetermined constant negative value −Idconst. Thus, the d-axis current Id2 in the normal system changes in a stepwise manner depending on the angular velocity ω.

Figure 10:
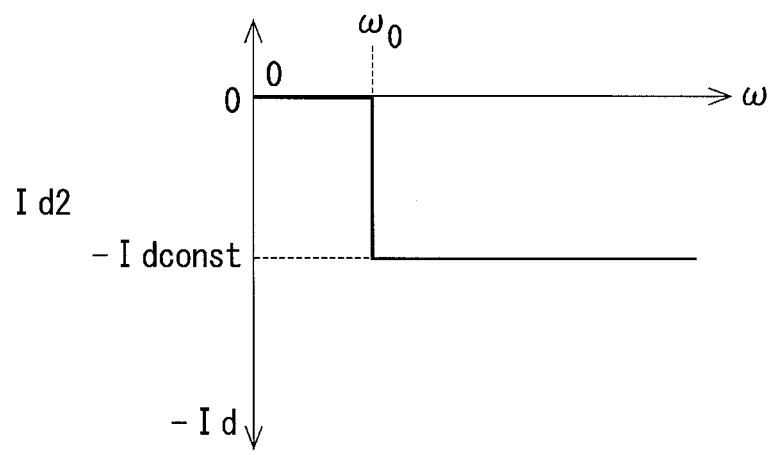
FIG. 10 is a diagram illustrating a relationship between a d-axis current in a normal system and an angular velocity of a motor according to a second embodiment of the present disclosure.

In an example shown in FIG. 10, one threshold ω0 is set. Alternatively, multiple thresholds can be set. In this case, the d-axis current Id2 in the normal system can change in a stepwise manner each time the angular velocity ω exceeds any one of the thresholds.

Third Embodiment

A third embodiment of the present disclosure is described below. According to the third embodiment, the d-axis current command value Id2* in the normal system is set so that the d-axis current Id2 can become a value represented by a formula (21). In such an approach, the denominator of the formula (19.2) can become zero regardless of the angular velocity ω.

In this way, the d-axis current Id2 can be set regardless of regardless of the angular velocity ω.

(Modifications)

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The motor 80 is not limited to the SPMSM. For example, the motor 80 can be a salient-pole motor such as an interior permanent magnet synchronous motor (IPMSM). While the SPMSM is suitable for high torque and low RPM output application, the IPMSM is suitable for low torque and high RPM output application. In the case of the IPMSM, the d-axis self-inductance Ld is different from the q-axis self-inductance Lq (i.e., Ld*Lq), and the d-axis mutual inductance Md is different from the q-axis mutual inductance Mq (i.e., Md≠Mq). Therefore, there is a need to expand the above formulas by separating the d-axis and q-axis terms from each other. However, even in the case of the IPMSM, heat generation and torque ripple can be reduced by passing the d-axis current in the normal system.

The structure of the ECU 10 is not limited to those shown in FIGS. 1 and 4. For example, the switching device can be an IGBT or a FET other than a MOSFET.

In the embodiments, the motor 80 as a multiple-phase rotating machine is a two-system three-phase motor. As defined previously, a pair of an electrical power converter (i.e., inverter) and a winding set forms a system. That is, the "two-system" means that the number of pairs of an electrical power converter and a winding set is two. The number of the systems is not limited to two.

Assuming that the number of the systems is three or more, when a failure occurs in one system, two or more systems will be normal. In this case, the d-axis current in each of the normal systems is set in the same manner as discussed in the embodiments.

In the embodiments where the number of phases is three, the d-axis current is defined as a current parallel to the direction of magnetic flux. Even when the number of phases is four or more, the d-axis current can be defined in the same manner as when the number of phases is three.

For example, when the number of phases is four, elements of a rotation matrix used to perform dq transformation are provided by trigonometric functions of (θ±n ×90°).

In the example shown in FIGS. 3A-3D, the motor 30 is configured such that the phase of the current supplied to the second winding set 802 is advanced by an electrical angle of 30° with respect the phase of the current supplied to the first winding set 801 (i.e., the phase difference is −30°). Alternatively, the motor 30 can be configured such that the phase of the current supplied to the second winding set 802 is delayed by an electrical angle of 30° with respect the phase of the current supplied to the first winding set 801 (i.e., the phase difference is +30°). The same is true for when the phase of the U-phase of the second winding set 802 is ±90° or ±150° with respect to the phase of the V-phase or W-phase (±120° with respect to the U-phase) of the first winding set 801.

That is, as long as the current phase difference between the systems is $(30\pm60\times n)°$, where n is an integer, the formula (16) can be derived from formulas similar to the formulas 3, 7.2, and 12. If the number of the systems is three or more, the same conclusion is obtained when the current phase difference between any two of the systems is $(30\pm60\times n)°$.

Although not explained here, the present inventor confirmed that even when the current phase difference between the systems is not $(30\pm60\times n)°$, a voltage equation equivalent to the formula (16) can be derived. Further, in theory, even when the number of phases is four or more, a voltage equation model equivalent to the formula (16) can be used regardless of the current phase difference between the systems.

The multiple-phase rotating machine is not limited to a motor. For example, the multiple-phase rotating machine can be a generator or an alternator. The multiple-phase rotating machine can be used for an apparatus other than an electric power steering apparatus.

What is claimed is:

1. A controller for driving a multiple-phase rotating machine having a plurality of winding sets magnetically coupled together, each winding set including a plurality of phase windings, the controller comprising:
   a plurality of electrical power converters capable of supplying alternating current to the plurality of winding sets, each electrical power converter including a plurality of legs, each leg being constructed with switching devices and provided to a corresponding one of the plurality of phase windings, a pair of each electrical power converter and a corresponding winding set being defined as a system;
   a failure detector capable of detecting a failure in the electrical power converter or the winding set in each system; and
   a control section capable of controlling an output of the electrical power converter by setting a d-axis current and a q-axis current to drive the electrical power converter, wherein
   when the failure detector detects the failure in any one of the systems, the control section stops the electrical power converter in the one of the systems and controls the output of the electrical power converter in each of the others of the systems by setting the d-axis current in such a manner that an electric current, which is generated by a counter-electromotive force in the plurality of phase windings in the one of the systems during rotation of the multiple-phase rotating machine, is reduced by reducing a voltage of the counter-electromotive force with a corresponding voltage that substantially cancels the voltage of the counter-electromotive force and is generated in the plurality of phase windings in the one of the systems through mutual inductance between the plurality of phase windings in the one of the systems and the plurality of phase windings in each of the others of the systems when the d-axis current, which is set by the control section, is supplied to the plurality of phase windings in each of the others of the systems.

2. The controller according to claim 1, wherein
   when the failure detector detects the failure in any one of the systems, the control section stops the electrical power converter in the one of the systems and controls the output of the electrical power converter in each of the others of the systems by setting the d-axis current depending on an angular velocity of the rotating machine.

3. The controller according to claim 1, wherein
   the number of the plurality of winding sets is two,
   the number of the plurality of phase windings is three,
   the alternating current supplied from one of the converters to one of the winding sets is defined as a first alternating current,
   the alternating current supplied from the other of the converters to the other of the winding sets is defined as a second alternating current, and
   the first alternating current and the second alternating current have the same amplitude and have a phase difference of $30°\pm60°\times n$, where n is an integer.

4. The controller according to claim 1, wherein
   the failure detector detects the failure when any one of the plurality of phase windings is electrically connected to at least one of an upper bus wire and a lower bus wire in any one of the systems,
   the upper bus wire is electrically connected to a high potential side of the leg, and
   the lower bus wire is electrically connected to a low potential side of the leg.

5. An electric power steering apparatus comprising:
   a multiple-phase rotating machine capable of producing steering assist torque to assist a driver in steering a steering wheel of a vehicle, the rotating machine having a plurality of winding set magnetically coupled together, each winding set including a plurality of phase windings;
   a controller as defined in claim 1; and
   a mechanical power transmission device capable of transmitting rotation of the rotating machine to a steering shaft coupled to the steering wheel.

6. The controller according to claim 1, wherein when the failure detector detects the failure in the one of the systems, the control section stops the electrical power converter in the one of the systems and sets the d-axis current to drive the electrical power converter in each of the others of the systems in such a manner that the electric current in the one of the systems is reduced by reducing a counter-electromotive force which is induced in the winding set of the one of the systems by magnetic coupling between the winding set of the one of the systems and the winding set of each of the others of the systems.

7. The controller according to claim 1, wherein the d-axis current, which is supplied to the plurality of phase windings in each of the others of the systems, is a negative d-axis current.

8. The controller according to claim 1, wherein the control section controls the output of the electrical power converter in each of the others of the systems by setting the d-axis current only when a rotation angular velocity of the multiple-phase rotating machine is larger than a predetermined threshold value.

* * * * *